(12) United States Patent
Pal

(10) Patent No.: US 9,882,357 B2
(45) Date of Patent: Jan. 30, 2018

(54) POWER DISTRIBUTION PANEL CONNECTOR HAVING THERMAL MANAGEMENT FEATURE

(71) Applicant: Hamilton Sundstrand Corporation, Charlotte, NC (US)

(72) Inventor: Debabrata Pal, Hoffman Estates, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 14/752,238

(22) Filed: Jun. 26, 2015

(65) Prior Publication Data

US 2016/0380412 A1    Dec. 29, 2016

(51) Int. Cl.
| | |
|---|---|
| H02B 1/56 | (2006.01) |
| B60R 16/03 | (2006.01) |
| H02G 5/10 | (2006.01) |
| H02B 1/015 | (2006.01) |
| H02B 1/20 | (2006.01) |

(52) U.S. Cl.
CPC ............... H02B 1/56 (2013.01); B60R 16/03 (2013.01); H02B 1/015 (2013.01); H02B 1/20 (2013.01); H02G 5/10 (2013.01)

(58) Field of Classification Search
CPC . H02B 1/56; H02B 1/015; H02B 1/20; H02G 5/10; H01H 85/10; H01H 85/044
USPC .................................................. 361/676–678
See application file for complete search history.

(56) References Cited

U.S. PATENT DOCUMENTS

| | | | | |
|---|---|---|---|---|
| 2,035,070 A | * | 3/1936 | Hixon .................... | H01R 4/308 439/805 |
| 2,282,279 A | * | 5/1942 | Xenis .................... | H01H 85/10 337/291 |
| 3,775,733 A | * | 11/1973 | Ege ...................... | H01R 9/2491 439/712 |
| 4,196,960 A | * | 4/1980 | Gelfand ................ | H01R 11/12 439/874 |
| 6,786,749 B2 | * | 9/2004 | Meiners ................ | H02G 5/00 174/71 B |
| 7,837,496 B1 | | 11/2010 | Pal | |
| 7,887,380 B2 | * | 2/2011 | Ross .................... | H01R 11/12 29/882 |
| 7,888,601 B2 | | 2/2011 | Bax et al. | |
| 7,914,300 B2 | * | 3/2011 | Akahori .............. | B60R 16/0238 439/76.2 |
| 7,955,101 B2 | * | 6/2011 | Lawson ................ | H01R 11/12 439/177 |

(Continued)

OTHER PUBLICATIONS

European Search Report for European Application No. 16176349.5 dated Oct. 27, 2016.

*Primary Examiner* — Zachary M Pape
(74) *Attorney, Agent, or Firm* — Carlson, Gaskey & Olds, P.C.

(57) ABSTRACT

An aircraft power distribution system according to an exemplary aspect of the present disclosure includes, among other things, a power source, a load, and a power distribution panel receiving power from the power source and selectively providing power to the load. The power source is connected to the power panel by a lug having a heat sink portion. The heat sink portion has at least one increased dimension relative to the remainder of the lug.

14 Claims, 4 Drawing Sheets

(56) References Cited

U.S. PATENT DOCUMENTS

| | | | |
|---|---|---|---|
| 8,382,535 B2 * | 2/2013 | Werthman | H01R 11/12 |
| | | | 439/177 |
| 8,724,325 B2 | 5/2014 | Schnetker et al. | |
| 9,083,095 B2 * | 7/2015 | Takase | H01M 2/1077 |
| 2009/0186518 A1 | 7/2009 | Chadbourne | |
| 2010/0302729 A1 | 12/2010 | Tegart et al. | |
| 2014/0002995 A1 | 1/2014 | Pal | |
| 2014/0045387 A1 * | 2/2014 | Furuya | H01R 13/428 |
| | | | 439/746 |
| 2014/0087584 A1 | 3/2014 | Pal | |
| 2014/0334074 A1 | 11/2014 | Pal et al. | |
| 2015/0099213 A1 | 4/2015 | Martinchek et al. | |

* cited by examiner

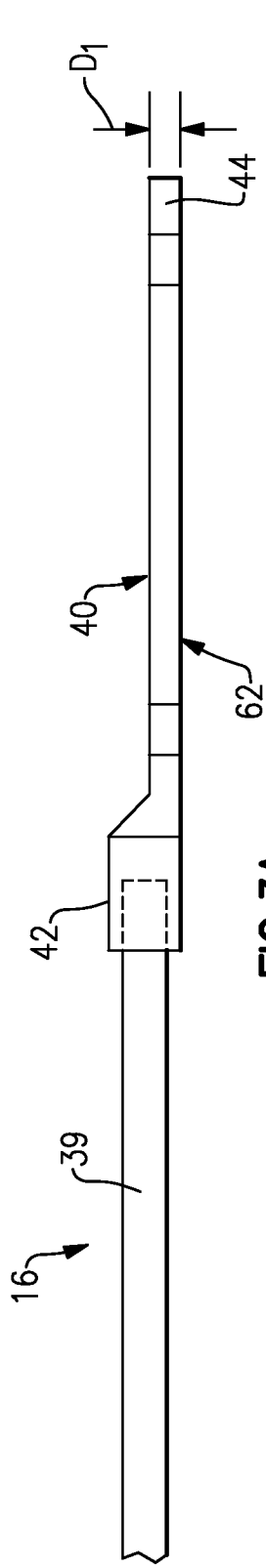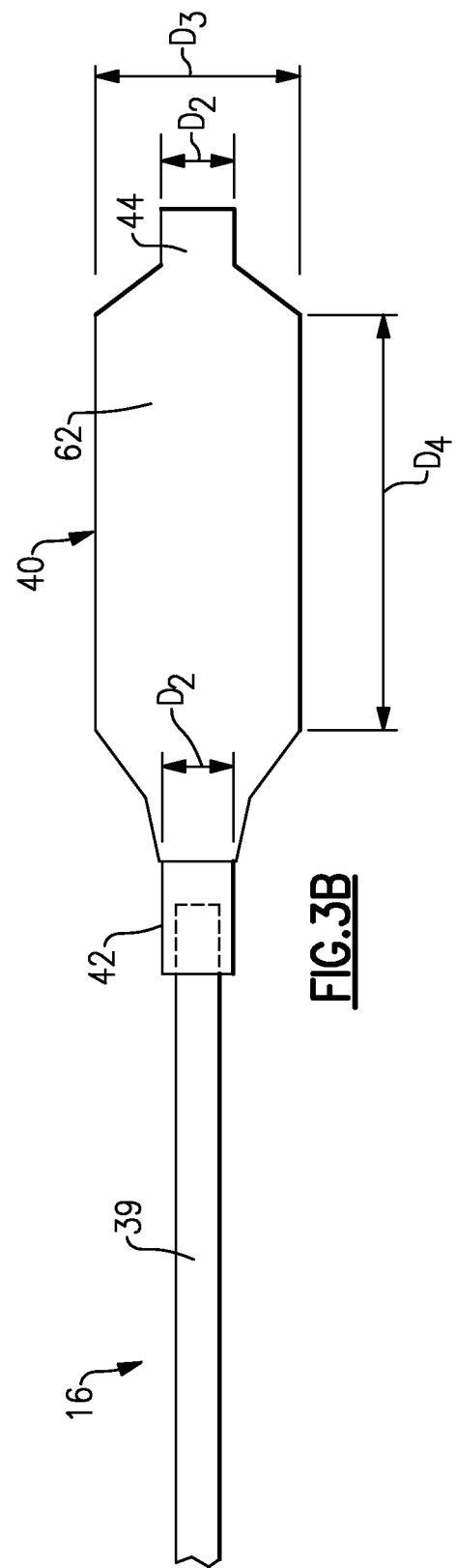

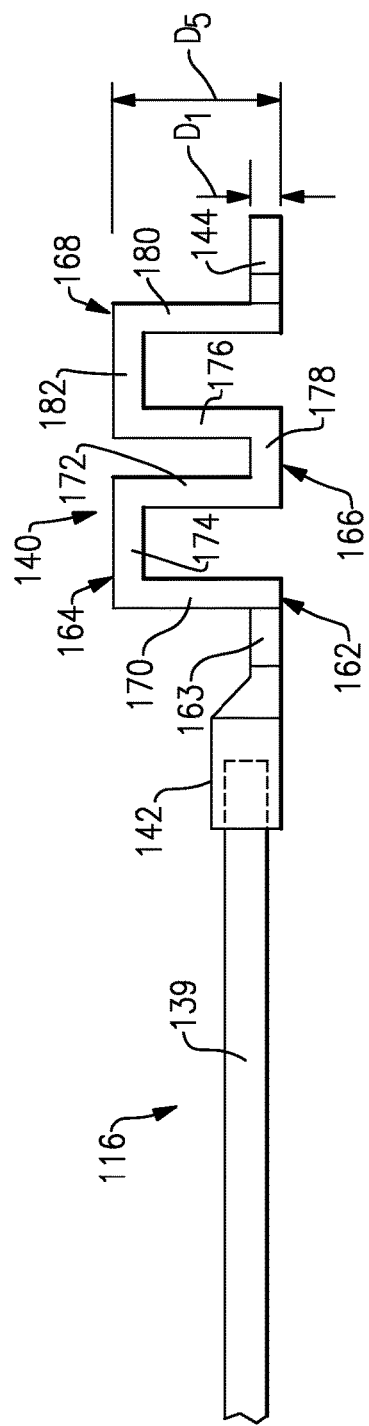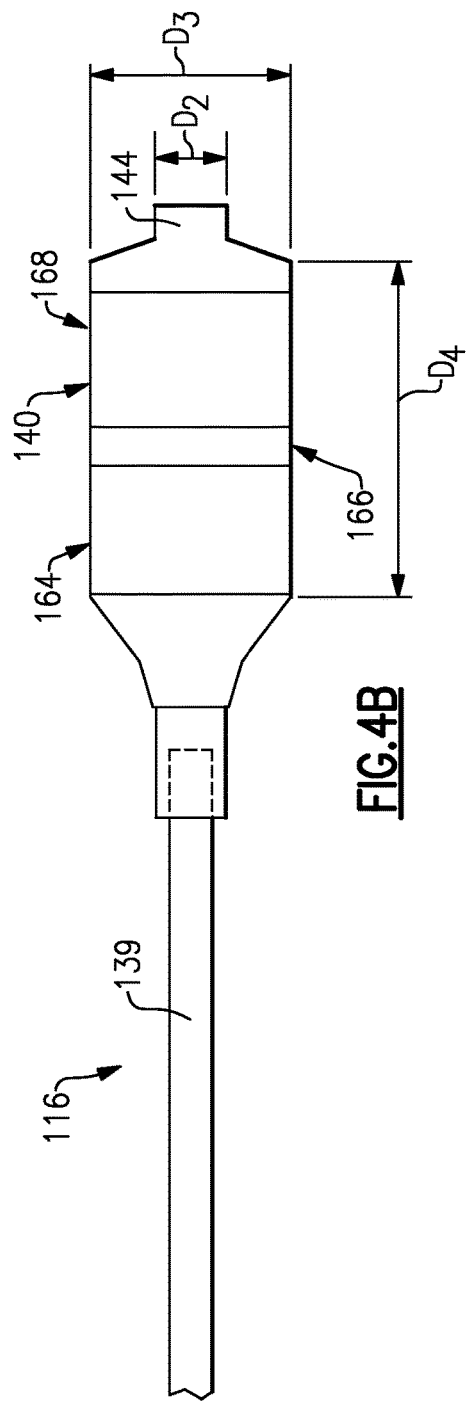
FIG.4A
FIG.4B

POWER DISTRIBUTION PANEL CONNECTOR HAVING THERMAL MANAGEMENT FEATURE

BACKGROUND

Aircraft electrical power systems have power distribution panels (sometimes called "power panels") configured to direct power from one or more power sources to one or more loads. Example power sources include generators from the engines of the aircraft, batteries, or auxiliary power units (APUs). Example loads include cabin lighting, hydraulic motors, cabin air compressors, or engine electric start motor controllers, to name a few.

Power distribution panels include high power contactors operable to selectively direct power between the power sources and the loads. The contactors are individual, replaceable units that mount to a printed wire board (PWB) via terminal posts or pads. The power distribution panel contains current-sensing features and control functions configured selectively to open or close the contactors. Power from the power sources is directed to the power distribution panel by way of feeder cables, which are electrically coupled to bus bars by way of an intermediate connector, known as a lug. The bus bars are electrically coupled to a contactor. When closed, the contactor is configured to direct power to one or more loads.

The components associated with the power distribution panel, including the feeder cables, bus bars, and the contactors, can generate significant heat during operation. Further, the different components may be rated to operate at different temperatures. The feeder cables typically are rated to operate at a higher temperature than the contactors. The contactors are cooled, in some examples, by exposure to ambient air.

SUMMARY

An aircraft power distribution system according to an exemplary aspect of the present disclosure includes, among other things, a power source, a load, and a power distribution panel receiving power from the power source and selectively providing power to the load. The power source is connected to the power panel by a lug having a heat sink portion. The heat sink portion has at least one increased dimension relative to the remainder of the lug.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows:

FIG. 3A is a side view of a first example lug.
FIG. 3B is a top view of the first example lug.
FIG. 4A is a side view of a second example lug.
FIG. 4B is a top view of the second example lug.

DETAILED DESCRIPTION

Figure 1:
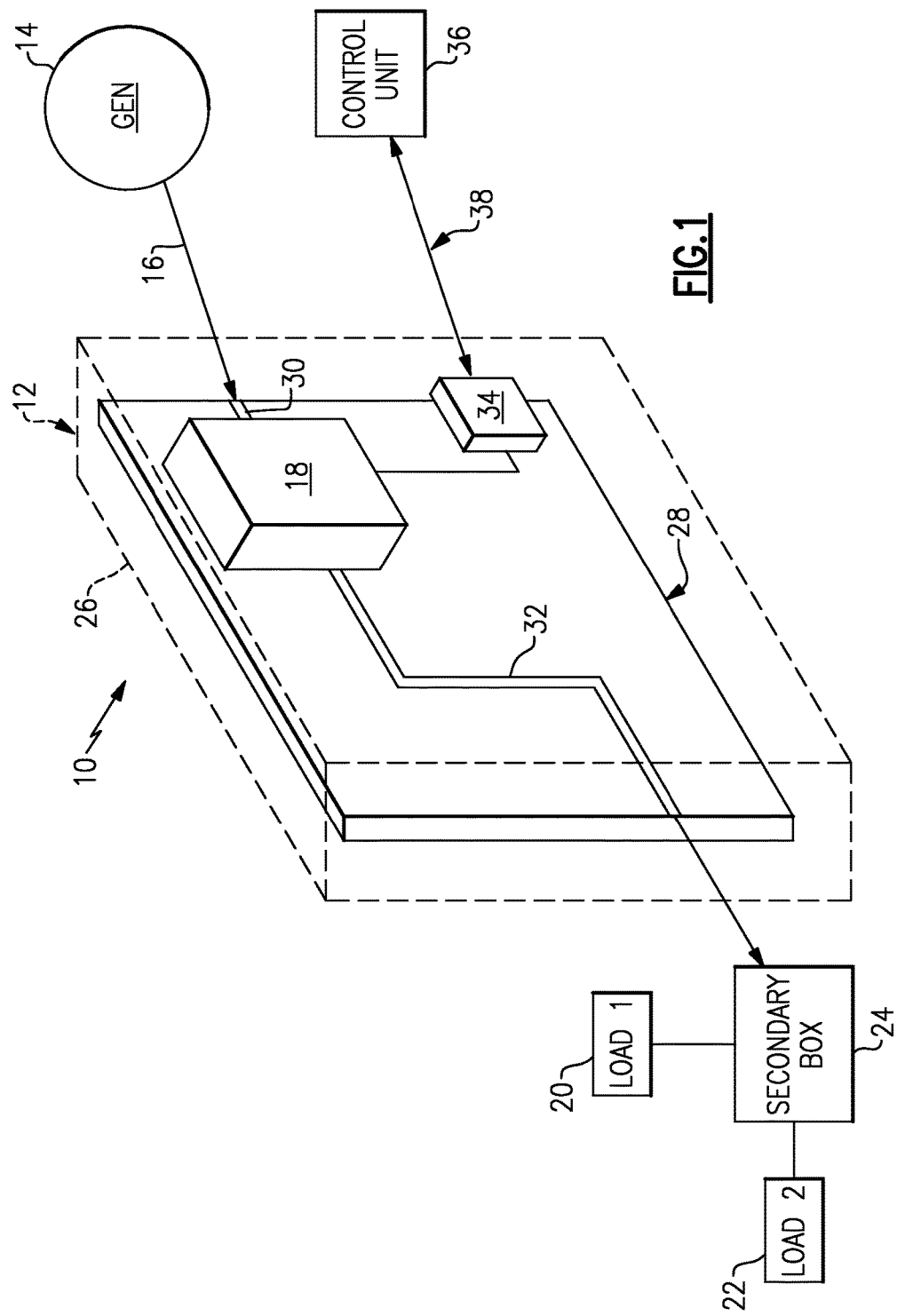
FIG. 1 is a schematic view of an aircraft power distribution system.

An example aircraft power distribution system 10 is schematically illustrated in FIG. 1. The system 10 may be embodied on an aircraft having a cabin and at least one gas turbine engine. The system 10 includes a power distribution panel (again, sometimes called a "power panel") 12 that receives power from a power source 14. Here, the power source 14 is a generator, such as a generator associated with a gas turbine engine of an aircraft.

While only one power source is illustrated, it should be understood that additional power sources come within the scope of this disclosure. In that case, the power distribution panel 12 would be configured to selectively direct power from the multiple power sources to one or more loads. Example power sources include the generators of the gas turbine engines associated with an aircraft. If a particular aircraft has two engines, there will be two separate power sources, at least one from each engine. Additional power sources may include batteries, auxiliary power units (APUs), ground power modules, and RAM air turbines, to name a few examples.

The power source 14 is connected to the power distribution panel 12 by way of an electrical connection 16, which will be discussed in detail below. The power distribution panel 12 includes one or more contactors 18 configured to direct power from the power source 14 to one or more loads 20, 22.

In this example, there is one contactor 18 and two loads 20, 22. This disclosure is not limited to power distribution panels having any particular number of contactors or loads. Some example loads include aircraft cabin lighting, hydraulic motors associated with the aircraft, cabin air compressors, and the engine start module. The first and second loads 20, 22 receive power from a secondary power distribution box 24 configured to selectively direct power from the power distribution panel 12 to the first and second loads 20, 22. The secondary power distribution box 24 is not required in all examples.

The power distribution panel 12 includes a housing 26 and a printed wire board (PWB) 28. The contactor 18 is mounted to the PWB 28. In this example, the contactor 18 is electrically coupled to the electrical connection 16 by way of a first bus bar 30, and is connected to the secondary power distribution box 24 by way of a second bus bar 32. The contactor 18 is configured to selectively open and close an electrical connection between the first and second bus bar 30, 32.

The PWB 28 also supports a connector 34 that communicates with a control unit 36 through a harness 38. The control unit 36 may be any known type of controller including memory, hardware, and software. The control unit 36 may be a bus power control unit (BPCU), and may further be in communication with a full authority digital engine control (FADEC). The control unit 36 is configured to store instructions and to provide instructions to various components of the system 10. In particular, the control unit 36 is configured to send signals to the connector 34, which ultimately reach the contactor 18, to open and close the electrical connection between the first and second bus bars 30, 32 to selectively direct power from the power source 14 to the first and second loads 20, 22.

Figure 2:
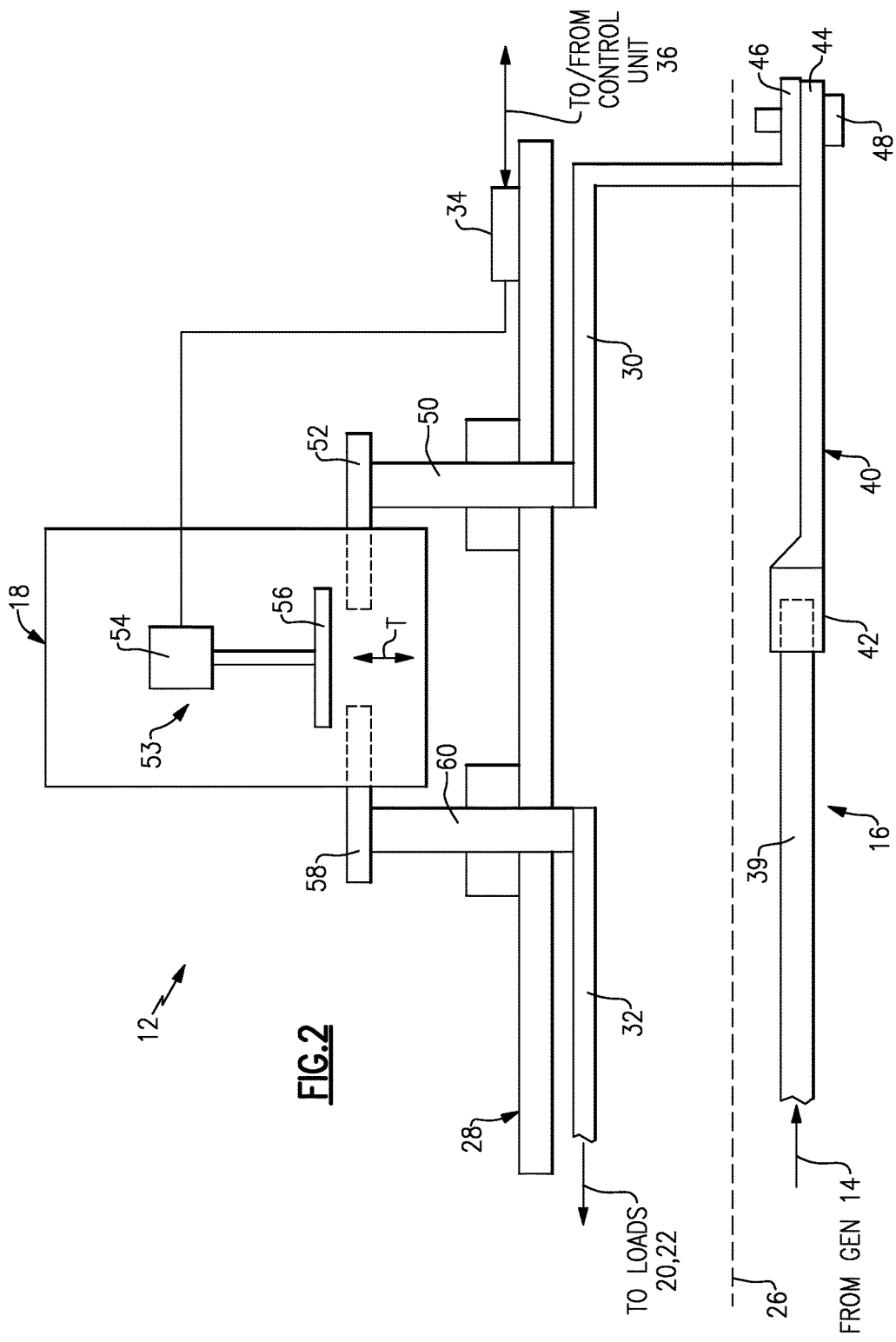
FIG. 2 schematically illustrates an example electrical connection between a power source and a power distribution panel.

FIG. 2 schematically illustrates a portion of the power distribution panel 12, and represents the electrical connection 16 between the power source 14 and the power distribution panel 12. As shown in FIG. 2, the power source 14 is connected to the first bus bar 30 by way of a feeder cable 39 and a lug 40. At a first end of the lug 40 adjacent the feeder cable 39, the lug 40 includes a cable receipt portion 42. The cable receipt portion 42 is provided by a socket receiving an end of the feeder cable 39 in this example. Other connections come within the scope of this disclosure.

At a second, opposite end of the lug 40, the lug 40 includes a lead portion 44 for connecting to a corresponding lead 46 of the first bus bar 30. In this example, a fastener 48 connects the lead portions 44, 46. The first bus bar 30 is electrically coupled to the contactor 18 via a first post 50 extending through the PWB wire board 28 to an input contactor lead 52 of the contactor 18. The input contactor lead 52 extends into the interior of the contactor 18, where there is a switch 53.

In this example, the switch 53 is selectively operable by an electromechanical actuator 54, which may include a solenoid, in response to instructions from the control unit 36. To close the contactor 18, the electromechanical actuator 54 is configured to translate a moveable arm 56 in a direction T such that the moveable arm 56 directly contacts both the input contactor lead 52 and an output contactor lead 58. To open the contactor 18, the moveable arm 56 is moved out of contact with the leads 52, 58. The output contactor lead 58 is electrically coupled to the second bus bar 32 by way of a second post 60 extending through the PWB 28.

The contactor 18 may suffer in performance if operating above a rated operating temperature. In one example, the feeder cable 39 is rated to operate at about 200° C. (about 390° F.). The contactor 18, in the same example, may only be rated to operate at about 150° C. (about 300° F.). The lug 40 serves to thermally isolate the contactor 18 from the feeder cable 39.

FIGS. 3A-3B illustrate one example lug 40 from a side view and a top view, respectively. The lug 40 includes a heat sink portion 62 between the cable receipt portion 42 and the lead portion 44. The heat sink portion 62 has at least one increased dimension relative to the remainder of the lug 40.

In the example of FIGS. 3A-3B, the lug 40 has a substantially constant height $D_1$, with the exception of the cable receipt portion 42, which is larger than $D_1$ in this example to accommodate the diameter of the feeder cable 39. In this example, $D_1$ is about 0.2 inches (about 0.5 cm).

With reference to FIG. 3B, the lug 40 has a width $D_2$ adjacent the ends (e.g., adjacent the cable receipt portion 42 and the lead portion 44). The width $D_2$ is about 0.5 inches (about 1.27 cm). Moving from left to right in FIG. 3, the width dimension of the lug 40 increases from $D_2$ to a second width $D_3$, which, in this example, is about 1.0 inch (about 2.54 cm). That is, the ratio of $D_3$ to $D_2$ is about 2 to 1. Between the ends, the lug 40 exhibits the width $D_3$ over a length $D_4$, which is about 6.0 inches (about 15.24 cm). The ratio of $D_4$ to $D_3$ is about 6 to 1. Adjacent the lead portion 44, the width of the lug 40 tapers down from the second width $D_3$ to the first width $D_2$, which, again, is about 0.5 inches (about 1.27 cm). The increased second width dimension $D_3$ provided over the length $D_4$ increases the surface area of the lug 40 exposed to the air adjacent the power distribution panel 12, which, in turn, increases the effectiveness of heat dissipation provided by the lug 40. The lug 40 dissipates heat that would otherwise have been transferred from the feeder cable 16 to the contactor 18.

FIGS. 4A-4B illustrate another example lug 140. To the extent not otherwise described or shown, the lug 140 corresponds to the lug 40 of FIGS. 3A-3B with like parts having reference numerals preappended with a "1."

In this example, the heat sink portion 162 incorporates first, second, and third vertical fins 164, 166, 168. The first and third fins 164, 168 are upwardly extending, and the second fin 166 is downwardly extending (the terms "upwardly" and "downwardly" are used with reference to the FIG. 4A orientation). When viewed from above (e.g., the view of FIG. 4B), the width dimensions of the lug 140 are the same as those of the lug 40. That is, the lug 140 includes the increased width dimension $D_3$ over the length $D_4$ between opposed ends. In addition to having the increased width dimension, the fins 164, 166, and 168 provide the lug 140 with an increased height dimension $D_5$, which is greater than $D_1$, which increases the surface area of the lug 140 and, in turn, increases the effectiveness of heat transfer. A ratio of D5 to D1 is about 6 to 1. In this example, $D_5$ is about 6 inches (15.24 cm).

In this example, the first fin 164 is provided by a first vertical leg 170 projecting upward from a main body portion 163 of the lug 140. The first vertical leg 170 is connected to a second vertical leg 172 by a first horizontal leg 174. The second fin 166 is provided by the second vertical leg 172, and a third vertical leg 176, which are connected by a second horizontal leg 178. Finally, the third fin 168 is provided by the third vertical leg and a fourth vertical leg 180, which are connected by a third horizontal leg 182. The terms "vertical" and "horizontal" are used relative to the FIG. 4A orientation.

While only three fins are illustrated in FIGS. 4A-4B, this disclosure is not limited to lugs having three fins. Depending on the application, the lug could include a different number of fins to provide a desired level of heat transfer. Further, this disclosure is not limited to the particular fin arrangement shown. The lug could include pedestal-like fins, for example.

It should be understood that terms such as "generally," "substantially," and "about" are not intended to be boundaryless terms, and should be interpreted consistent with the way one skilled in the art would interpret the term.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An aircraft power distribution system, comprising:
a power source;
a load; and
a power distribution panel receiving power from the power source and selectively providing power to the load, wherein the power source is connected to the power panel by a lug having a heat sink portion, the heat sink portion having at least one increased dimension relative to the remainder of the lug;
wherein the at least one increased dimension includes an increased width, wherein the lug has a first width at first and second ends, and a second width between the first and second ends, the second width greater than the first width.

2. The system as recited in claim 1, wherein a ratio of the second width to the first width is about 2 to 1.

3. The system as recited in claim 2, wherein the first width is about 0.5 inches and the second width is about 1 inch.

4. The system as recited in claim 1, wherein the lug has the second width over a length, and wherein a ratio of the length to the second width is about 6 to 1.

5. The system as recited in claim 4, wherein the length is about 6 inches.

6. The system as recited in claim 1, wherein:
the power source includes one of a generator of a gas turbine engine, a battery, an auxiliary power unit (APU), a ground power module, and a RAM air turbine; and
the load includes one of aircraft cabin lighting, a hydraulic motor, a cabin air compressor, and an engine electric start motor controller.

7. An aircraft power distribution system, comprising:
a power source;
a load; and
a power distribution panel receiving power from the power source and selectively providing power to the load, wherein the power source is connected to the power panel by a lug having a heat sink portion, the heat sink portion having at least one increased dimension relative to the remainder of the lug;
wherein the lug includes at least one fin, the at least one increased dimension including an increased height provided by the at least one fin; and
wherein the at least one fin includes first, second, and third vertical fins, the first and third vertical fins projecting upward from a main body portion of the lug, and the second vertical fin projecting downward.

8. The system as recited in claim 7, wherein a ratio of the increased height to a height of a main body portion of the lug is about 6 to 1.

9. A power distribution panel, comprising:
a printed wire board;
a contactor mounted to the printed wire board;
a first bus bar between the contactor and a power source, wherein the first bus bar is connected to the power source by way of a lug having a heat sink portion, the heat sink portion having at least one increased dimension relative to the remainder of the lug; and
a second bus bar between the contactor and a load, the contactor operable to selectively open and close an electrical connection between the first and second bus bars;
wherein the at least one increased dimension includes an increased width, and wherein the lug has a first width at first and second ends, and a second width between the first and second ends, the second width greater than the first width.

10. The power distribution panel as recited in claim 9, wherein a ratio of the second width to the first width is about 2 to 1.

11. The power distribution panel as recited in claim 10, wherein the lug has the second width over a length, wherein a ratio of the length to the second width is about 6 to 1.

12. The power distribution panel as recited in claim 9, wherein the lug includes at least one fin, the at least one increased dimension including an increased height provided by the at least one fin.

13. The power distribution panel as recited in claim 12, wherein a ratio of the increased height to a height of a main body portion of the lug is about 6 to 1.

14. The power distribution panel as recited in claim 13, wherein the at least one fin includes first, second, and third vertical fins, the first and third vertical fins projecting upward from a main body portion of the lug, and the second vertical fin projecting downward.

* * * * *